US005449187A

United States Patent [19]

Schueman

[11] Patent Number: 5,449,187

[45] Date of Patent: Sep. 12, 1995

[54] AIR POWERED ACTUATOR FOR RETRACTING THE LOCKING PINS OF A SLIDER

[75] Inventor: Gerald L. Schueman, Oakland, Iowa

[73] Assignee: Schueman Transfer, Inc., Oakland, Iowa

[21] Appl. No.: 195,852

[22] Filed: Feb. 10, 1994

[51] Int. Cl.$^6$ .................... B60G 5/00

[52] U.S. Cl. .................... 280/149.2; 280/405.1; 180/209

[58] Field of Search .................... 180/209, 24.01, 24.02; 280/149.20, 405.1

[56] References Cited

U.S. PATENT DOCUMENTS

| | | | |
|---|---|---|---|
| 2,935,332 | 5/1960 | Delay | 280/81 |
| 2,976,051 | 3/1961 | Morey | 280/81 |
| 3,146,000 | 8/1964 | Holzman | 280/81 |
| 3,365,211 | 1/1968 | Ginsburg | 280/81 |
| 3,372,946 | 3/1968 | Hutchens | 280/81 |
| 3,778,079 | 12/1973 | Vornberger et al. | 280/80 B |
| 4,286,797 | 9/1981 | Mekosh, Jr. et al. | 280/149.2 |
| 4,635,742 | 1/1987 | Bertolini | 180/209 |
| 4,838,566 | 6/1989 | Baxter et al. | 280/149.2 |
| 4,838,578 | 6/1989 | Baxter | 280/149.2 |
| 4,944,522 | 7/1990 | Hart | 280/149.2 |
| 4,993,737 | 2/1991 | Torcomian | 280/149.2 X |
| 5,137,296 | 8/1992 | Forman | 180/209 X |
| 5,199,732 | 4/1993 | Lands et al. | 180/209 X |
| 5,232,234 | 8/1993 | McCombs | 280/149.2 X |
| 5,314,201 | 5/1994 | Wessels | 280/149.2 X |
| 5,346,233 | 9/1994 | Moser | 280/149.2 |

*Primary Examiner*—Kenneth R. Rice
*Assistant Examiner*—Christopher P. Ellis
*Attorney, Agent, or Firm*—Zarley, McKee, Thomte, Voorhees & Sease; Dennis L. Thomte

[57] ABSTRACT

An air powered actuator is provided for exerting sufficient force on the locking pins of a slider for the adjustment of the suspension of a vehicle longitudinally with respect to the body of the vehicle. The air powered actuator is controlled from the cab of the vehicle.

4 Claims, 6 Drawing Sheets

192
190
186
189
188
184
154
152
166
164
96
98
92
114
70
116
100
90
88
36
38
74
72
20
92
94
92

AIR POWERED ACTUATOR FOR RETRACTING THE LOCKING PINS OF A SLIDER

BACKGROUND OF THE INVENTION

1. Field of the Invention

This invention relates generally to a slider which is used to adjust the suspension of a vehicle longitudinally with respect to the body of the vehicle, and more particularly to an air powered actuator for retracting the locking pins of the slider.

2. Background of the Invention

Sliders are commonly used to enable longitudinal adjustment of the suspension of a tandem axle trailer relative to the van or body of the trailer. Conventional sliders normally comprise a pair of side rails which are secured to the left and right sides of the van and which extend longitudinally therealong the underside thereof. The suspension of the trailer is carried by a frame which includes left and right slide members which are slidably mounted with respect to the side rails of the van. A plurality of locking pins lock the frame in various positions with respect to the side rails. When it is desired to adjust the suspension of the trailer with respect to the body, the locking pins are retracted to permit the frame to slide with respect to the side rails of the van. However, if the vehicle is not sitting on perfectly level ground, the locking pins may be difficult to pull from their registering openings in the frame and the side rails of the body. Heretofore, the normal procedure for freeing the locking pins was to have one person pull on the actuating arm connected to the locking pins while the driver attempted to jiggle or jog the trailer with respect to the tandem axle, which had been previously locked in place with the air powered emergency brake. The above solution was not satisfactory and an effort to solve the problem is disclosed in U.S. Pat. No. 4,838,566. Although it is believed that the device of the '566 patent makes the problem described above easier to solve, it is still believed that the device disclosed in the '566 patent does not completely solve the problems of retracting the locking pins from their registering openings in the frame and the side rails of the trailer.

SUMMARY OF THE INVENTION

The invention described herein is an improvement over the slider of U.S. Pat. No. 4,838,566 in that an air powered actuator is operatively connected to the locking pin interconnects so that air pressure may be utilized to pull the locking pins from their registering openings in the frame and the side rails of the trailer. In operation, when it is desired to longitudinally adjust the suspension of the trailer with respect to the trailer body, the emergency brake for the tandem axle is first set or activated. The air powered actuator is then actuated which exerts sufficient retracting force on the locking pins to pull the locking pins from their registering openings in the frame and the side rails of the trailer.

It is therefore a principal object of the invention to provide an improved slider for adjustment of the suspension of a trailer longitudinally with respect to the body of the trailer.

A further object of the invention is to provide an air powered actuator for retracting the locking pins of a slider.

A further object of the invention is to provide an invention of the type described above which may be easily connected to the conventional slider adjustment actuator without extensive modification thereof.

Still another object of the invention is to provide a device of the type described above which is safe to use.

Still another object of the invention is to provide a device of the type described above which is convenient to use.

Still another object of the invention is to provide an invention of the type described above which is economical of manufacture and easy to install.

These and other objects will be apparent to those skilled in the art.

DESCRIPTION OF THE PREFERRED EMBODIMENT

Figure 1:
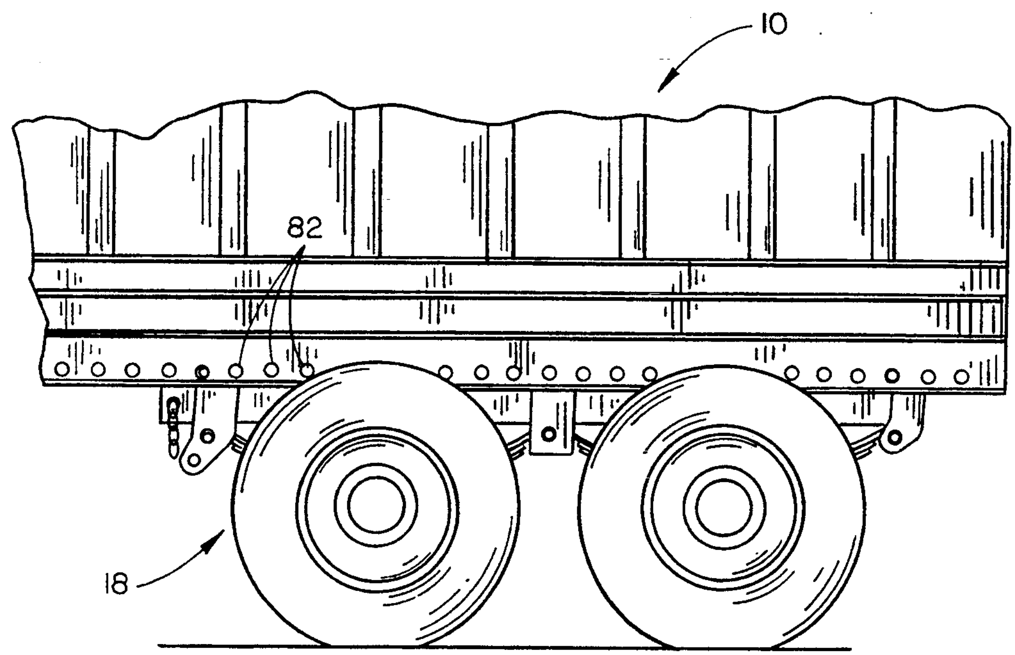
FIG. 1 is a partial side view of the suspension system of a trailer having a tandem axle.
Figure 2:
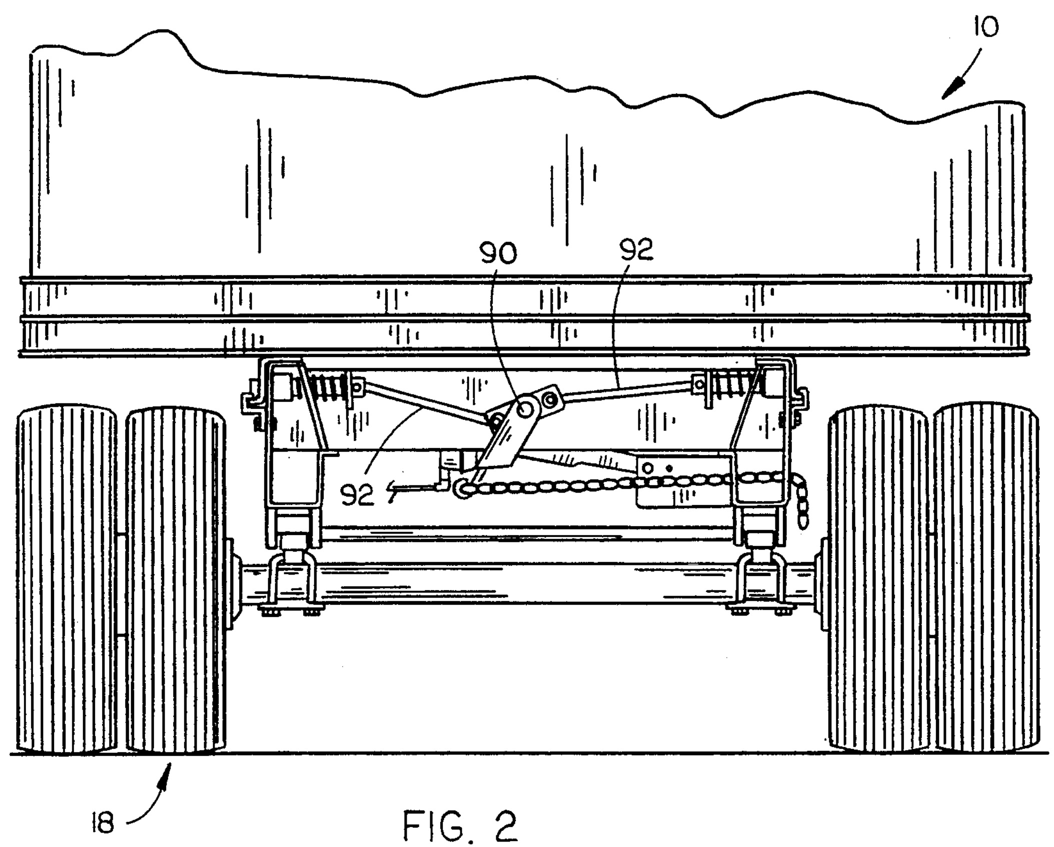
FIG. 2 is a front view of the trailer of FIG. 1.

The numeral 10 refers generally to a trailer which is conventionally pulled by a truck or tractor having a fifth wheel connection thereto. Trailer 10 includes a frame 12 having a plurality of transversely extending cross frame members 14 extending between the sides thereof. A slider 16, such as disclosed in U.S. Pat. No. 4,838,566, is secured to the underside of the cross frame members 14 near the rear end of the trailer 10. The numeral 18 refers to a tandem axle suspension which is operatively connected to the slider 16 for movement longitudinally therewith with respect to the trailer 10.

Figure 4:
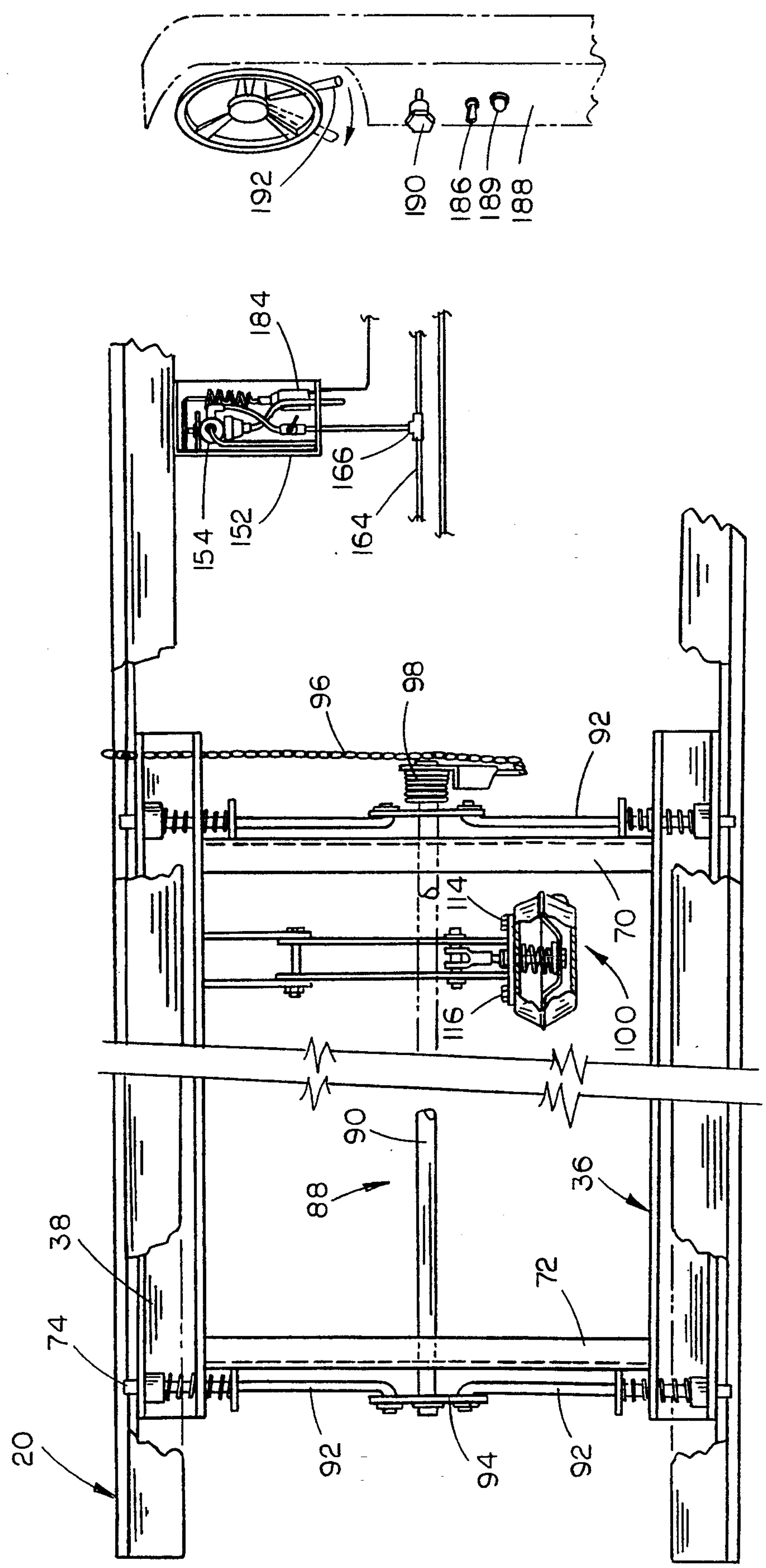
FIG. 4 is a partial top view of the air powered actuator of this invention and its relationship with respect to the slider assembly.
Figure 5:
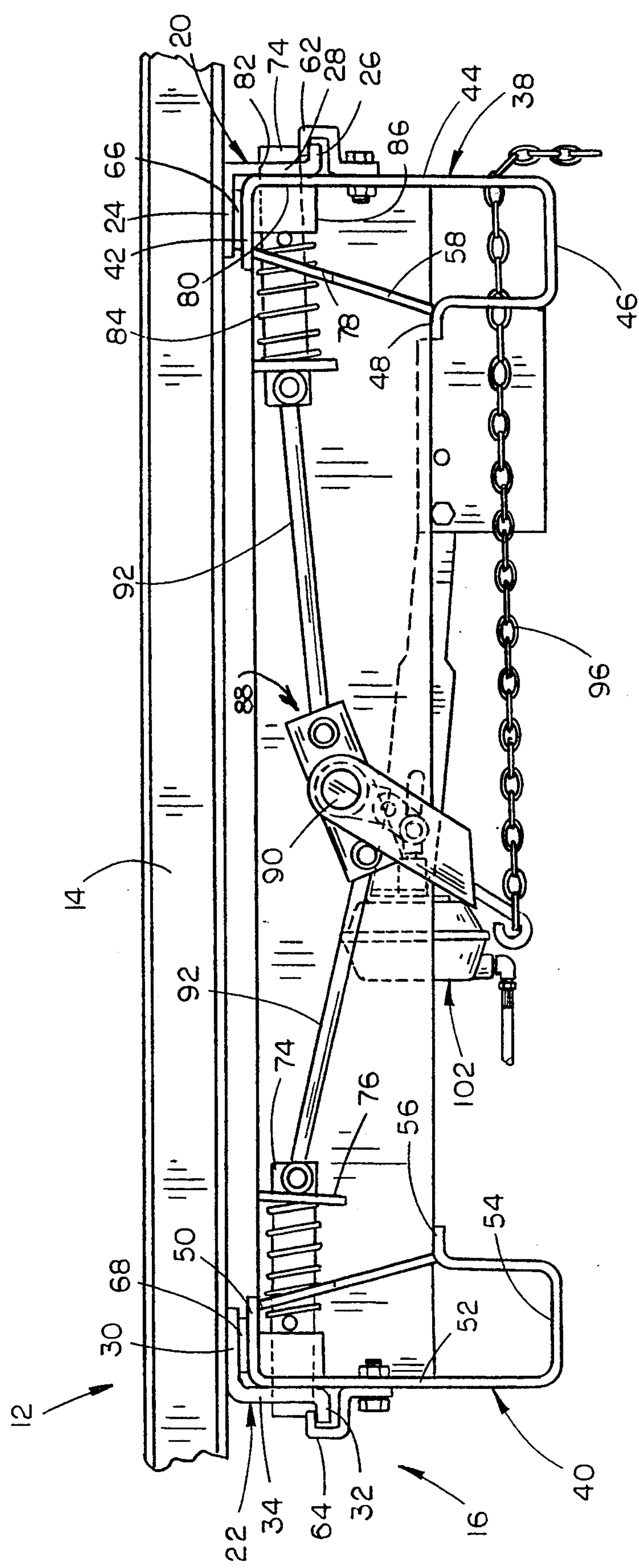
FIG. 5 is a front view of the slider adjustment assembly and the air powered actuator of this invention.

Slider 16 includes a pair of side rails 20 and 22 which are secured to the underside of the cross frame members 14. Side rail 20 is generally Z-shaped and includes a top flange 24, bottom flange 26 and a substantially vertically disposed web 28 interconnecting flanges 24 and 26. As seen in FIG. 5, side rail 22 includes top flange 30, bottom flange 32 and a substantially vertically disposed web 34 which interconnects the flanges 30 and 32. Slider 16 also includes a rectangular frame, generally designated by the reference numeral 36 in FIG. 4, which carries a suspension of the tandem axle and which includes left and right slide members 38 and 40. The slide members 38 and 40 are slidable longitudinally of the van or trailer on the side rails 20 and 22. As is best illustrated in FIG. 5, each of the slide members 38 and 40 are of generally G-shaped in section. Slide member 38 includes an upper inwardly-directed horizontal flange 42 spaced below the upper flange 24 of the side rail 20, a generally vertical side wall 44 disposed inwardly of the web 28 of a side rail, a lower inwardly directed horizontal flange 46, and a lip 48 bent inwardly from the inner end of the lower flange 46. Similarly, slide member 40 has an upper inwardly-directed horizontal flange 50 spaced below the upper flange 30 of side rail 22, a generally vertical side wall 52 disposed inwardly of the web 34 of the side rail 22, a lower inwardly-directed horizontal flange 54, and a lip 56 bent inwardly from the inner end of the lower flange 54. Slide members 38 and 40 are provided with upright reinforcing gussets 58 and 60 respectively, the end result being that each slide member 38 and 40 is a hollow-beam member.

A plurality of hook-shaped sliders 62 are secured to the side wall 44 of the slide member 38 and overlie the lower flange 26 of the side rail 20 as illustrated in FIG. 5. A plurality of hook-shaped sliders 64 are secured to the side walls 52 of the slide member 40 and overlie the lower flange 32 of the side rail 22. The hook-shaped sliders 62 and 64 permit the frame 36 of the slider 16, carrying the suspension, to be slidably longitudinally adjusted relative to the side rails 20 and 22. Pad 66 is provided between the upper flange 42 of slide member 38 and the upper flange 24 of side rail 20 to ensure a relatively close sliding fit between the two members. A pad 68 is provided between the upper flange 50 of slide member 40 and the flange 30 of side rail 22 to also ensure a relatively close sliding fit between the two members. Cross beams 70 and 72 are secured to and extend between the slide members 38 and 40 and extend therebetween. In particular, the cross beams 70 and 72 are secured to the gusset plates 58 and 60.

A plurality of locking pins, each designated with the reference numeral 74 are provided for locking the frame 36 in various positions of adjustment relative to the side rails 20 and 22. Four such pins are illustrated in FIG. 4, two at the front of the slider 16, adjacent opposite slide members 38 and 40, and two at the rear of the slider adjacent opposite slide members 38 and 40. The locking pins 74 are supported by mounting plates 76 secured to the cross beams 70 and 72 for horizontal linear movement in a direction generally transverse to the trailer and are conjointly retractable for permitting adjustment of the frame 36 to various positions of adjustment relative to the side rails 20 and 22 and extensible for locking the frame 36 in a selected position of adjustment. As shown in FIG. 5, when a pin 74 is in its extended position, it extends through opening 78 in gusset 58 and through an opening 80 in the respective side wall of the respective slide member 38 or 40. Locking pin 74, when in its extended position, also extends through one of a series of openings 82 in the web of the respective slide member 38 or 40. The openings 82 are spaced at regular intervals to provide the necessary adjustment. Each pin 74 is biased towards its extended position by means of a spring 84 disposed between the mounting plate 76 and a radial flange 86 around the pin towards its outer end. The locking pins 74 are conjointly movable between extended and retracted positions by means of linkage generally indicated at 88 interconnecting the pins. The linkage 88 comprises a shaft 90 extending longitudinally of the frame generally parallel to the slide members 38 and 40 and approximately midway therebetween. As illustrated in FIG. 4, shaft 90 is journaled in cross frame members 70 and 72 for rotation as will be described hereinafter. A plurality of links 92, one for each locking pin 74, interconnect shaft 90 and the pins 74. As illustrated in FIG. 4, the inner ends of the links 92 connecting the two locking pins 74 at the rear of the slider are pivotally connected to opposite ends of plate 94 which is secured to the shaft 90, and the outer ends of these links are pivotally connected to their respective pins 74. Thus, when shaft 90 is rotated in a first direction, the links 92 will pull the pins 74 from their extended positions to their retracted positions. Conversely, when the shaft 90 is rotated in a direction opposite to that just described, the links 92 will move the pins 74 towards their extended positions. The springs 84 on the locking pins 74 urge the locking pins 74 to their extended positions.

An actuating chain 96 is provided for conventionally rotating the shaft 90 thereby affecting articulation of the links 92 to retract the locking pins 74. In U.S. Pat. No. 4,838,566, the chain 96 is in the form of a rod. The chain 96 extends generally transversely with respect to the trailer and laterally outwardly through the slide member 38. A spring-loaded linkage or crank 98 interconnects the inner end of the chain 96 and the shaft 90 for a purpose which is described in U.S. Pat. No. 4,838,566. It should be noted, that all of the structure previously described is conventional structure, except for chain 96 being substituted for a pull rod, which is disclosed in U.S. Pat. No. 4,838,566. It is the structure described above which applicant believes does not perform satisfactorily thereby necessitating the means of this invention to power rotate the shaft 90 to positively cause the retraction of the locking pins 74.

For purposes of description, the air powered actuator of this invention is referred to generally by the reference numeral 100. It should be noted that although the air powered actuator 100, which will now be described, is ideally suited for use with the slider described in U.S. Pat. No. 4,838,566, the air powered actuator 100 of this invention may be easily adapted for use with any slider employing retractable locking pins. For example, the air powered actuator of this invention could easily be modified to operate the locking pins disclosed in U.S. Pat. Nos. 2,935,332; 2,978,051; 3,146,000; 3,365,211; 3,372,946; 3,778,079; or 4,838,578.

Air powered actuator 100 includes a pressure cylinder or canister 102 of conventional design having a rod 104 extending from one side of the housing 106. Threaded studs S and S' extend from one side of housing 106. Housing 106 has an air inlet 108 which is connected to a source of air under pressure as will be described hereinafter. When air under pressure is supplied to the housing 106, the rod 104 is extended therefrom in conventional fashion. Preferably, the pressure cylinder 102 is of the type which is normally associated with vehicle air brakes. Although it is preferred that the pressure cylinder or air brake 102 be utilized, the pressure cylinder 102 could be replaced by any suitable fluid cylinder, fluid motor, etc., wherein a movable rod, similar to rod 104, extends therefrom when air or fluid pressure is supplied to the device.

Rod 104 has a clevis 110 mounted thereon which extends through bracket 112 which is secured to the studs S and S' of housing 106 by nuts 114 and 116. Bracket 112 includes a pair of spaced-apart arms 118 and 120 having elongated slots 122 and 124 formed therein respectively. The ends of the arms 118 and 120 are secured to bracket 126 by means of bolt 128. Bracket 126 is secured to the slide member 38 by welding or the like.

Pin 130 is slidably received in the slots 122 and 124 and is maintained therein by means of the washers 132 and 134 positioned on the outer ends thereof outwardly of the arms 118 and 120. Retaining keys 136 and 138 are received in the outer ends of the pin 130 to maintain the washers 132 and 134 on the pin 130.

Figure 3:
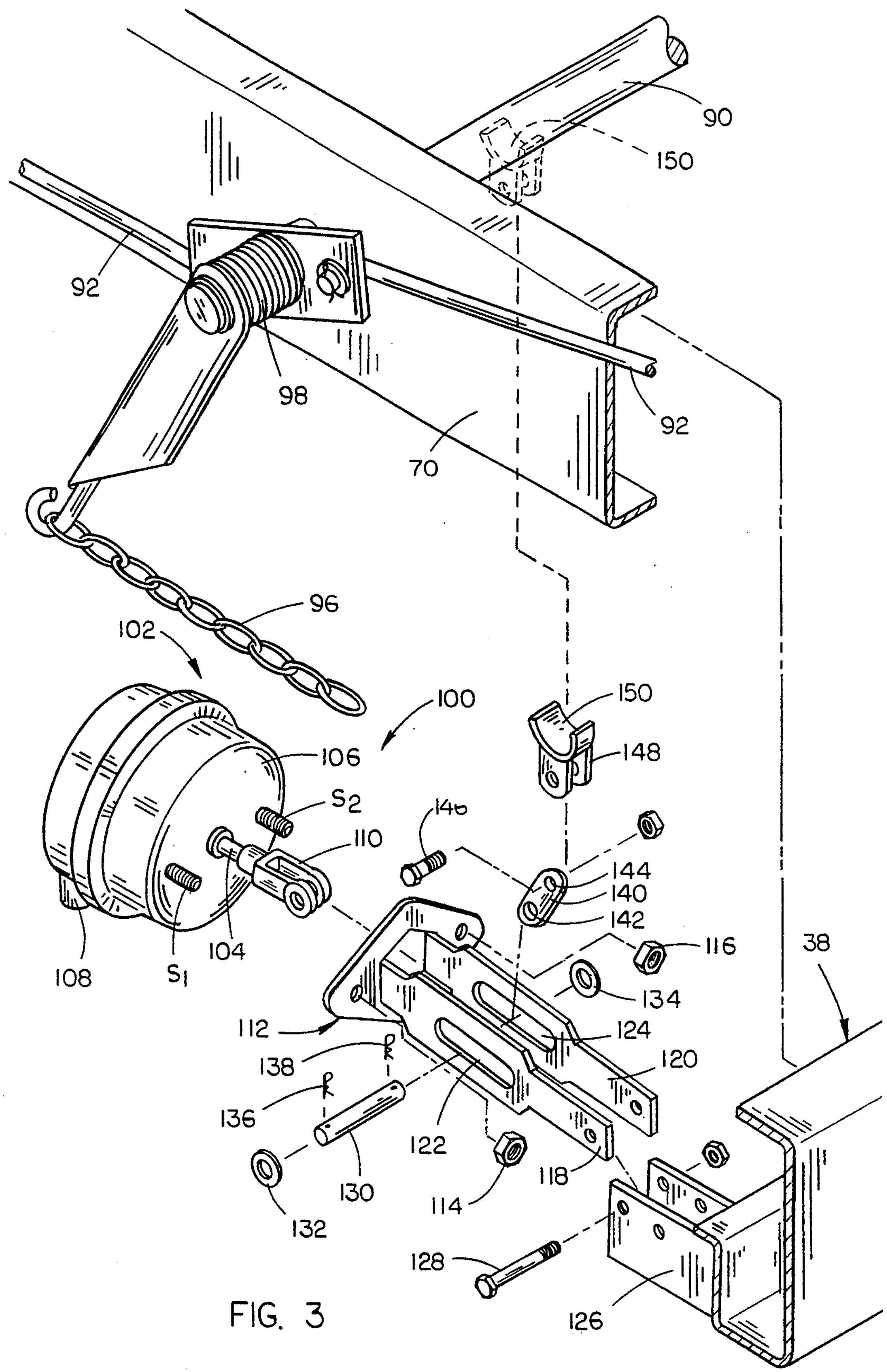
FIG. 3 is an exploded perspective view of the air powered actuator of this invention.

Link 140 is provided which has an opening 142 at one end thereof which receives the pin 130. As seen in FIG. 3, link 140 is rotatably mounted on the pin 130 between the arms 118 and 120. Link 140 is provided with an opening 144 at its other end which receives a bolt 146 to enable bracket 148 to be pivotally secured thereto. Bracket 148 includes a crescent-shaped or semi-circular-shaped clip 150 which is welded to shaft 90.

Figure 6:
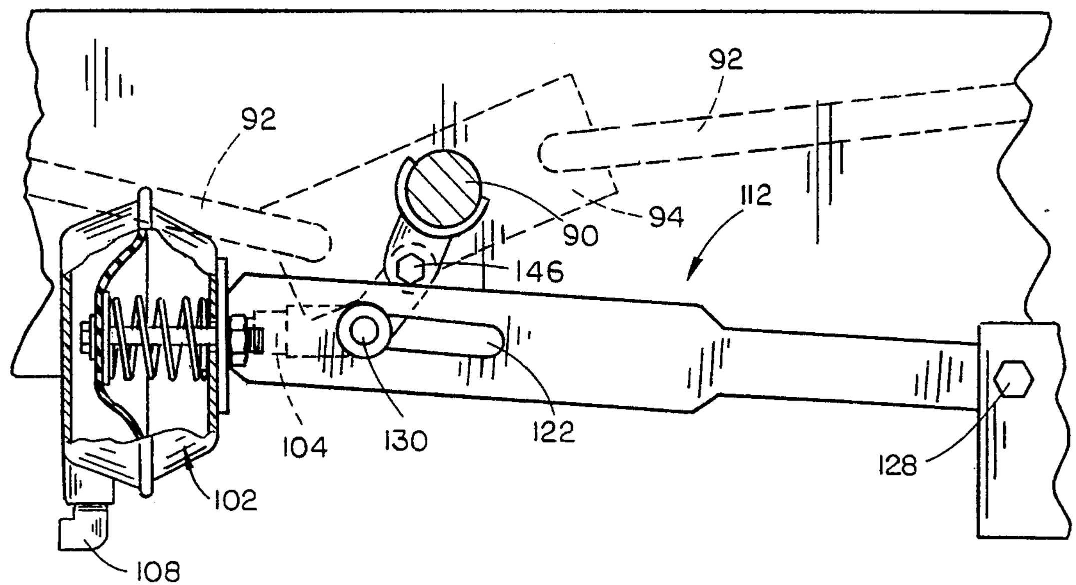
FIG. 6 is a front view of the air powered actuator of this invention which illustrates the air powered actuator in its non-actuating position.
Figure 7:
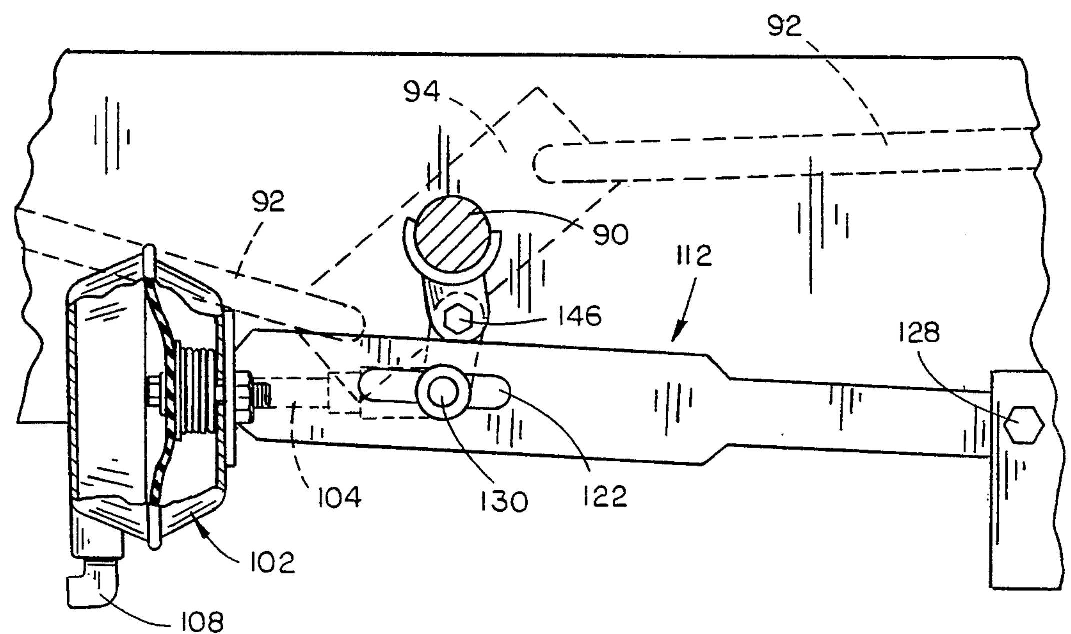
FIG. 7 is a view similar to FIG. 6 except that the air powered actuator has been actuated.

FIG. 6 illustrates the rod 104 of cylinder 102 in its normal retracted position. With the rod 104 in the retracted position, the links 92 are in the position so that the locking pins 74 are in their locked or extended position. When it is desired to retract the locking pins 74 to enable the suspension of the trailer to be longitudinally moved with respect to the body of the trailer, air is supplied to cylinder 102 so that rod 104 is extended therefrom. As rod 104 is extended from the cylinder 102, pin 130 is moved laterally outwardly in the slots 122 and 124. The outward movement of the pin 130 in the slots 122 and 124 causes the link 140 to be pivoted which in turn causes the bracket 148 to be pivoted which causes the shaft 90 to be rotated from the position of FIG. 6 to the position of FIG. 7. The rotational movement of the shaft 90 causes the plate 94 to be rotated which causes the links 92 to retract the locking pins 74.

In the event that the locking pins 74 are completely stuck in their respective openings, due to some binding force thereon, the rod 104 may not be able to be extended by the pressure exerted in the pressure cylinder 102. However, with air pressure being maintained in the cylinder 102, outward force or pressure is applied to the rod 104. The operator of the vehicle then slightly "jogs", "jiggles" or moves the trailer with respect to the tandem axle suspension. As soon as the trailer has been sufficiently moved to relieve the binding forces on the locking pins 74, the outward pressure being exerted on the rod 104 will cause the shaft 90 to be rotated so that the locking pins 74 are retracted.

Figure 8:
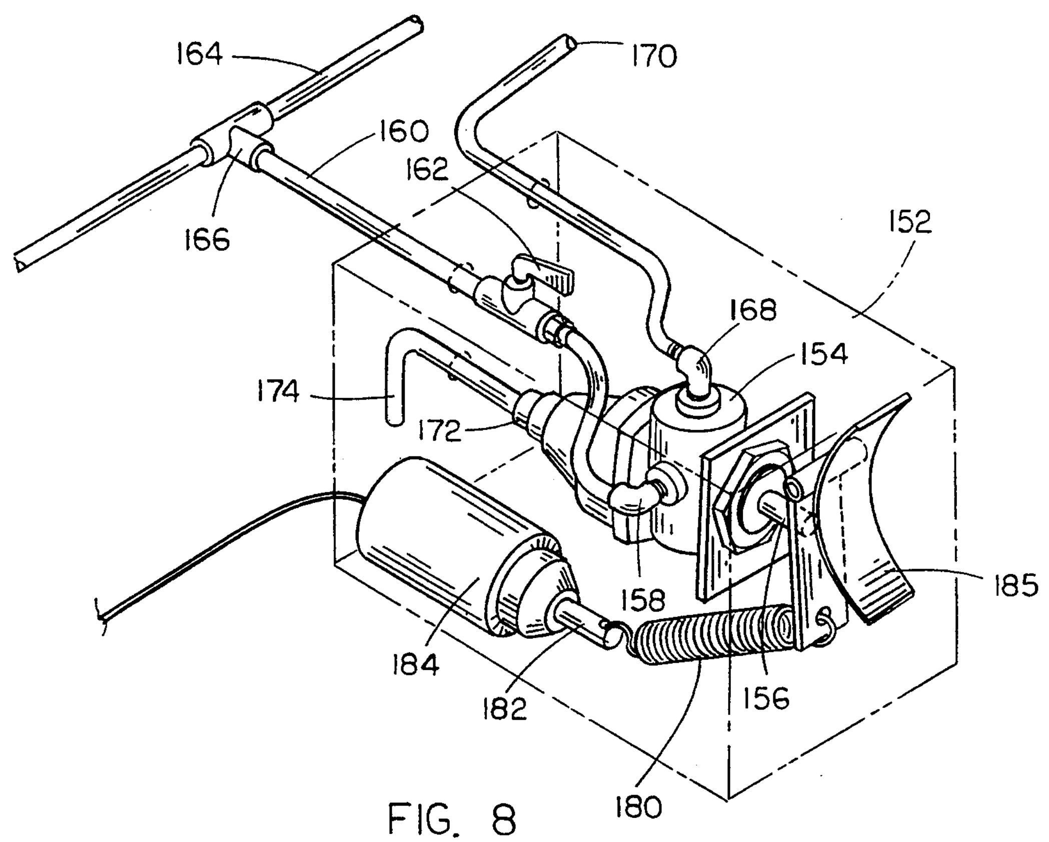
FIG. 8 is a perspective view of the control mechanism for the air powered actuator.
Figure 9:
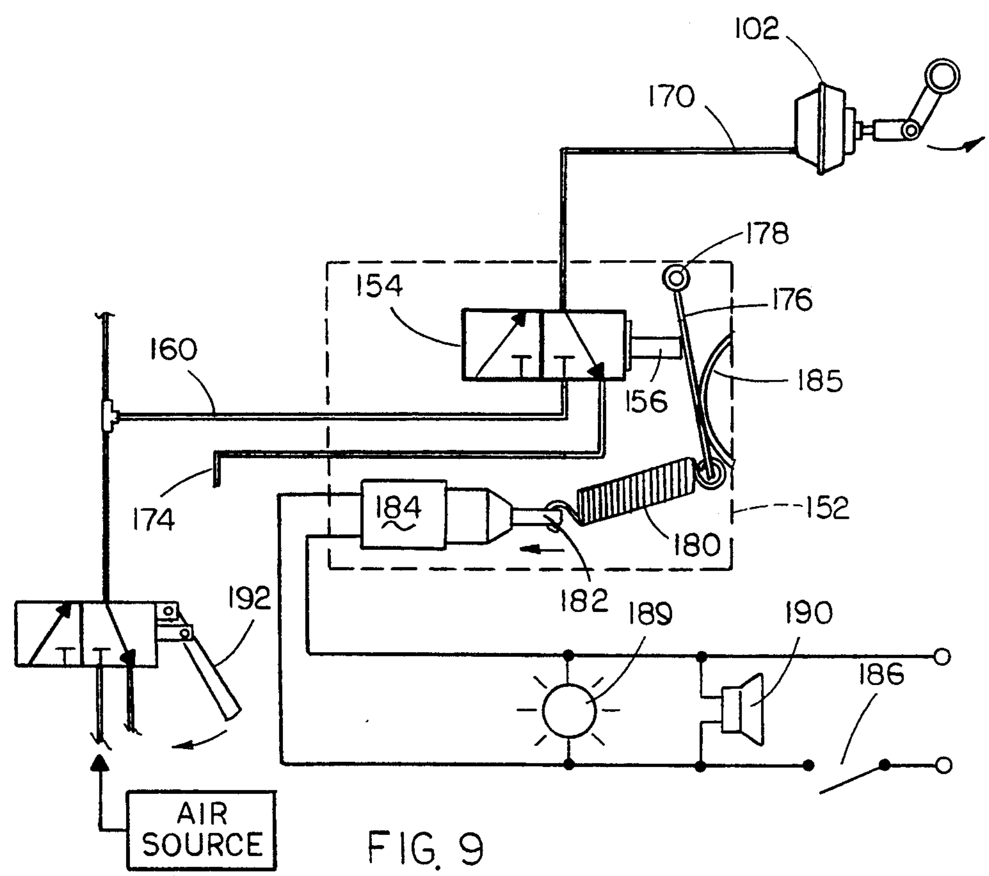
FIG. 9 is a schematic of the circuitry for the air powered actuator of this invention.

Box 152 is mounted on the assembly and contains certain of the control components so that air under pressure is supplied to the cylinder 102 as required. As seen in FIGS. 8 and 9, an air valve 154 is provided in box 152 which includes an actuator or valve rod 156 extending from one side thereof. Valve 154 has an air inlet 158 which is connected to an air line 160. A manually controlled shut-off valve 162 is imposed in line 160 as seen in FIG. 8. Line 160 is connected to the air line 164 by a tee fitting 166. Air line 164 is the air line for the air brakes for the tandem axle of the vehicle. Valve 154 has discharge port 168 connected thereto which has line 170 extending therefrom. Line 170 is connected to the fitting 108 on cylinder 102. Valve 154 also includes an exhaust port 172 having an exhaust line 174 connected thereto.

Arm 176 is pivotally secured at its upper end 178 to the box 152 and extends downwardly therefrom in the movable path of the valve rod 156. One end of spring 180 is connected to the lower end of arm 176 and has its other end connected to the rod 182 of electric solenoid 184. A semi-circular leaf spring 185 normally urges the arm 176 into engagement with the outer end of the rod 156. As seen in FIG. 9, valve 154 is normally closed to prevent the supply of air from line 160 to line 170. When solenoid 184 is actuated, rod 182 is retracted into the solenoid 184 which causes the arm 176 to be pivoted in a clockwise direction as viewed in FIG. 9 to cause the actuator arm 156 to be pushed into the body of the valve 154 so that valve 154 is moved from its normally closed position to an open position so that air may be supplied from line 160 to line 170 and to the cylinder 102. When the valve 154 is opened as just described, rod 104 of cylinder 102 is extended to cause the locking pins 74 to be retracted.

When the locking pins 74 have been retracted and the slider moved longitudinally with respect to the frame of the trailer body, solenoid 184 is deenergized which causes the rod 182 of solenoid 184 to be extended therefrom which in turn causes the valve 154 to again be moved to the position illustrated in FIG. 9 so that air under pressure is no longer supplied to line 170. When valve 154 is moved to the position of FIG. 9, the air in cylinder 102 and line 170 is exhausted through line 174.

Solenoid 184 is controlled by a switch 186 located on the dash 188 in the operator's cab. When switch 186 is closed, the solenoid 184 is actuated, as is the indicator light 188, to indicate to the operator that the system is being operated to retract the locking pins 74. An audible signal device 190 is also actuated when the switch 186 is closed to further indicate to the operator that the locking pins 74 are being retracted. The control or supply of air to valve 154 is controlled by the air brake control for the brakes on the rear tandem axle. As seen in FIG. 9, the brake control lever 192 is movable to a position wherein air is supplied to the brakes of the rear tandem axle. At the same time, air is supplied through line 160 to the valve 154.

In operation, when it is desired to adjust the suspension or the rear tandem axle of the trailer with respect to the body of the trailer, lever 192 is actuated to supply air to the brakes on the rear tandem axle to lock the rear tandem axle in position. At the same time, air is supplied to the valve 154. The operator then closes switch 186 which causes the solenoid 184 to be actuated so that rod 182 is retracted into solenoid 184 which causes actuating arm or rod 156 of valve 154 to be retracted thereinto so that air is supplied to line 170 and cylinder 102. At this time, the indicator light 189 and the audible signal device 190 are actuated to indicate to the operator that air is being supplied to the cylinder 102 so that the locking pins 74 will be retracted.

When the locking pins 74 have been retracted, the operator of the vehicle drives the vehicle either forwardly or rearwardly with respect to the stationary rear tandem axle to properly position the body of the trailer with respect to the rear tandem axle. When the trailer has been properly positioned, the operator then opens switch 186 which de-energizes the solenoid 184 which in turn causes the discontinuance of the air supply to line 170. The air in the cylinder 102 is exhausted through the exhaust line 174. When the air pressure has been removed from the cylinder 102, the springs 84 on the locking pins 74 urge the locking pins 74 outwardly to their extended positions. The outward movement of the pins 74 causes the shaft 90 to be rotated from the position of FIG. 7 to the position of FIG. 6 with such rotation causing the rod 104 of the cylinder 102 to also be returned to the position of FIG. 6.

When the locking pins 74 have been properly positioned in their extended and locked position, the operator moves the lever 192 to release the brakes on the trailer so that the trailer may be operated in its normal condition.

Thus it can be seen that a novel air powered actuator has been provided for exerting sufficient force on the locking pins 74 to enable the locking pins to be moved to their retracted position so that the suspension of the trailer may be adjusted as desired. The actuator of this invention may be operated from the cab of the vehicle without the necessity of a person standing at the side of the vehicle and exerting outward force on the actuator rod 96. Further, the air cylinder 102 exerts sufficient force to normally retract the locking pins 74 regardless of the binding forces being applied to the locking pins 74. Additionally, the air powered actuator of this invention may be connected to the existing slider actuator mechanism without extensive modification thereof. Thus it can be seen that the invention accomplishes at least all of its stated objectives.

I claim:

1. A slider for adjustment of the suspension of a vehicle longitudinally with respect to the body of the vehicle, the slider comprising a pair of side rails adapted to be secured at the left and right sides of the body in a fixed position extending longitudinally of the body, and a frame adapted to carry the suspension comprising left and right slide members slidable longitudinally of the body on the side rails, and a plurality of locking pins for locking the frame in various positions of adjustment relative to the side rails, said locking pins being retractable for permitting adjustment of the frame to a selected position of adjustment and extensible for locking the frame in a selected position of adjustment, means for retracting said locking pins including linkage interconnecting said pins for conjoint movement of the pins between extended and retracted positions, said linkage including shaft means extending longitudinally of the frame, a crank for rotating said shaft means, and a plurality of links interconnecting said shaft means and the locking pins whereby rotation of the shaft means in one direction effects retracting of the locking pins and rotation of the shaft means in the opposite direction effects extension of the locking pins, an actuating member connected to said crank manually movable from a first position to a second position for rotating the crank to rotate the shaft means in said one direction to retract the locking pins, spring means associated with said locking pins for yieldably urging said locking pins to their extended positions wherein the improvement comprises:

an air powered actuator means mounted on said slider including a movable actuator rod extending therefrom which is operatively secured to said shaft means for rotating said shaft means in said one direction to effect retraction of said locking pins;

said air powered actuator means comprising an air brake actuator including a housing having a diaphragm means positioned therein which defines an air inlet side in said housing, said air inlet side being in communication with a source of air pressure, said actuator rod being connected to said diaphragm means where the introduction of pressurized air into said air inlet side causes the extension of said actuator rod, said diaphragm means being movable from a neutral position to a pressurized position, said air brake actuator including a spring means for urging said diaphragm means from its pressurized position to its neutral position;

said housing of said air brake actuator being secured to said slider for movement therewith; said housing having a first side through which the actuator rod extends, a first bracket secured to said first side and including a pair of elongated arms extending from said housing; each of said elongated arms having elongated longitudinally extending slots formed therein; a second bracket secured to said shaft means which is positioned between said elongated arms; said actuator rod being positioned between said elongated arms; a pin means positioned in said slots in said elongated arms which interconnects said second bracket and said actuator rod; said first bracket being operatively secured to said slider.

2. A slider for adjustment of the suspension of a vehicle longitudinally with respect to the body of the vehicle, the slider comprising a pair of side rails adapted to be secured at the left and rights sides of the body in a fixed position extending longitudinally of the body, and a frame adapted to carry the suspension comprising left and right slide members slidable longitudinally of the body on the side rails, and a plurality of locking pins for locking the frame in various positions of adjustment relative to the side rails, said locking pins being retractable for permitting adjustment of the frame to a selected position of adjustment and extensible for locking the frame in a selected position of adjustment, means for retracting said locking pins including linkage interconnecting said pins for conjoint movement of the pins between extended and retracted positions, said linkage including shaft means extending longitudinally of the frame, a crank for rotating said shaft means, and a plurality of links interconnecting said shaft means and the locking pins whereby rotation of the shaft means in one direction effects retracting of the locking pins and rotation of the shaft means in the opposite direction effects extension of the locking pins, an actuating member connected to said crank manually movable from a first position to a second position for rotating the crank to rotate the shaft means in said one direction to retract the locking pins, spring means associated with said locking pins for yieldably urging said locking pins to their extended positions wherein the improvement comprises:

an air powered actuator means mounted on said slider including a movable actuator rod extending therefrom which is operatively secured to said shaft means for rotating said shaft means in said one direction to effect retraction of said locking pins;

said air powered actuator means comprising an air brake actuator including a housing having a diaphragm means positioned therein which defines an air inlet side in said housing, said air inlet side being in communication with a source of air pressure, said actuator rod being connected to said diaphragm means where the introduction of pressurized air into said air inlet side causes the extension of said actuator rod, said diaphragm means being movable from a neutral position to a pressurized position, said air brake actuator including a spring means for urging said diaphragm means from its pressurized position to its neutral position;

an air exhaust valve in operative communication with said air inlet side of said housing to permit the exhaust of air from said air inlet side of said housing when the supply of pressurized air to said air inlet side is discontinued so that said spring means, which is associated with said locking pins, may urge said locking pins to their extended positions;

a control means for operating said air brake actuator; said control means including a first air line connected to the source of pressurized air; a first, normally closed air valve having an air inlet in communication with said first air line; said first air valve including an air outlet in communication with said air brake actuator; said first air valve having an exhaust side; said first air valve including a valve rod extending therefrom for moving said first air valve from its normally closed position to an open position; an electric solenoid means operatively connected to said valve rod of said first valve for moving said first air valve from its normally closed position to its open position so that pressurized air will be supplied to said air brake actuator when said electric solenoid is energized.

3. The slider of claim 1 wherein said first bracket is pivotally secured to said slider.

4. The slider as set forth in claim 2 wherein the air in said air brake actuator is released therefrom, after said electric solenoid has been de-energized, through the exhaust side of said first air valve.

* * * * *